United States Patent [19]

Herbold et al.

[11] 4,062,304
[45] Dec. 13, 1977

[54] APPARATUS FOR THE PYROLYSIS OF WASTE PRODUCTS

[75] Inventors: Oskar Herbold, Meckesheim; Dieter Dittloff, Sinsheim, both of Germany

[73] Assignee: Helma Lampl, Sinsheim-Rohrbach, Germany

[21] Appl. No.: 707,239

[22] Filed: July 21, 1976

[30] Foreign Application Priority Data

Apr. 2, 1976   Germany .............................. 2614417

[51] Int. Cl.² .......................... F23G 5/00; F23K 3/00
[52] U.S. Cl. .................................... 110/8 R; 110/110;
198/677; 202/118; 202/218; 202/238
[58] Field of Search ................. 201/2.5; 202/118, 128,
202/218, 238; 110/8 R, 11, 14, 110; 198/677, 664

[56] References Cited

U.S. PATENT DOCUMENTS

| 951,549 | 3/1910 | Steiner | 198/677 |
|---|---|---|---|
| 1,654,540 | 1/1928 | Files | 198/664 X |
| 1,922,960 | 8/1933 | Klein | 110/110 |
| 2,697,068 | 12/1954 | Poindexter et al. | 202/218 |
| 3,229,384 | 1/1966 | Goulston | 202/238 X |
| 3,362,887 | 1/1968 | Rodgers | 110/11 X |
| 3,774,555 | 11/1973 | Turner | 110/11 |
| 3,838,015 | 9/1974 | Buchbinder et al. | 202/218 |

*Primary Examiner*—Kenneth W. Sprague
*Attorney, Agent, or Firm*—Anthony J. Casella

[57] ABSTRACT

Apparatus for the pyrolysis of waste products such as polymeric and/or inorganic waste products comprising a reactor vessel and in which fluid or paste-like waste materials may be pyrolised by tilting the reactor vessel upwardly from its entrance end to its delivery end. Paddle blades are provided for driving the waste products therethrough which are mounted so that their angle of attack is variable.

3 Claims, 6 Drawing Figures

APPARATUS FOR THE PYROLYSIS OF WASTE PRODUCTS

The invention relates to apparatus for carrying out pyrolysis of polymeric and/or inorganic waste products, in which decomposition of the waste products, including crushed solids, into solid, fluid and gaseous constituents takes place in a reactor vessel including a feed device which transports the waste products through the reactor vessel, a heating device arranged coaxially around the reactor vessel, a charging hopper equipped with air exclusion locks connected to the entrance end of the reactor vessel, at least one airtight delivery chamber connected to the delivery end of the reactor vessel, and in which the delivery chamber is connected to the suction side of a blower, as described in our copending U.S. patent application Ser. No. 625,311 filed Oct. 23, 1975.

The apparatus in the Parent Application is admirably suited for carrying out pyrolysis of waste products containing hydrocarbons, such as vulcanized rubber, and is especially suitable for the pyrolysis of old tyres. According to the description in the parent patent application, the waste products are at first pre-dried, after which heating of the crushed waste products to their decomposition temperature occurs at sub-atmospheric pressure, so that the oils and waxes which are released from the solid residual material can be sucked off for subsequent distillation.

Certain difficulties can, however, arise if pyrolysis of fluid energy-containing substances such as oil or resin waste is to be carried out with the apparatus according to the Parent Application. In the event of the treatment of such substances, it may happen in certain cases that the material is not completely pyrolized, as if the material is fluid or pastelike it may run too rapidly through the vessel. The degree of efficiency of the apparatus is thus disadvantageously affected.

It is a primary object of the invention to overcome these disadvantages and provide apparatus on which liquid or paste-like materials may be pyrolized.

SUMMARY OF THE INVENTION

The present invention provides apparatus for carrying out the pyrolysis of waste products comprising a reactor vessel, a heating device around said reactor vessel for heating the waste products in the vessel, an airtight charging hopper at a delivery end of the reactor vessel, an airtight delivery chamber at a delivery end of said reactor vessel, a driven feed device for driving waste products through the reactor vessel between said entrance and delivery ends, a blower, the suction side of which is connected to the delivery end of the vessel, pivot means pivotally mounting the reactor vessel, and an adjustor device to adjust the angle of inclination of the reactor vessel to the horizontal, paddle blades being mounted on the feed device by variable mounting means whereby their angle of attack can be preselected by means of the variable mounting means.

By adjusting the inclination of the reactor vessel, the passage of incompletely pyrolised substances through the vessel can be prevented if the waste products being treated are in liquid or paste-like form. Thus the apparatus of the invention can be used with a wide variety of waste materials and with a high degree of efficiency. Preferably the entire apparatus is pivotably mounted by said pivot means and is adjustable by said adjustor means. The pivot means may comprise a horizontal pivot means and the adjustor means comprise a threaded spindle which passes through a pivotably mounted nut, lifting links being attached to the delivery end of the vessel and being operable by the threaded spindle.

The variable mounting means may comprise a threaded pin attached to each paddle blade, which pin passes through a hollow driving shaft and is secured on the opposite side by a nut. The pin preferably passes through a transverse tube through the hollow driving shaft which transverse tube is mounted gastightly into the hollow driving shaft and the paddle blade preferably extends arcuately in a range of between 90 and 180° in a generally circumferential direction.

It will be understood that a sufficiently strong partial vacuum must be provided in the reactor vessel as the temperature necessary for the pyrolization of some waste materials may well lie within the spontaneous combustion range of the waste materials, and only by producing such a vacuum can the risk of explosion be removed.

DESCRIPTION OF PREFERRED EMBODIMENT

Figure 1:
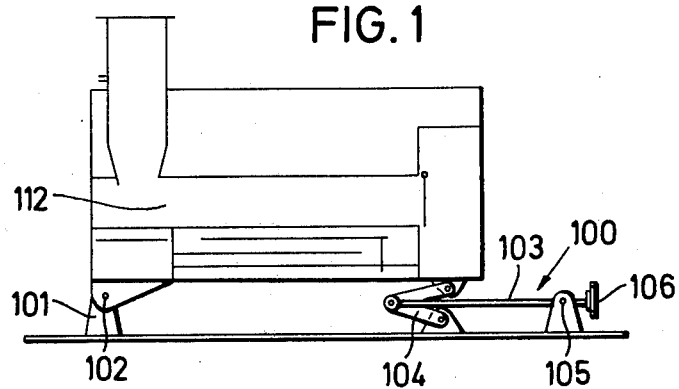
FIG. 1 shows a diagrammatic side section of the apparatus according to the invention with a horizontally arranged reactor vessel in the form of a tube.

According to FIG. 1 there is illustrated a reactor vessel of the type disclosed in the parent patent application Ser. No. 44347/75 (Ser. No. 625,311) comprising a reactor tube 112, a driven feed device for driving waste products through the reactor tube between entrance and delivery ends thereof, a heating device around said reactor tube for heating the waste products in the vessel, an airtight charging hopper including air exclusion locks, an airtight delivery chamber, and a blower (not shown) the suction end of which is connected to the delivery end of the reactor tube. The apparatus is arranged on a platform in such a way that the reactor tube 112 lies substantially horizontally. On the entrance side, which is on the left in the drawing, the apparatus is pivotably mounted on a bearing block 101, in a pivot bearing 102. At the delivery end, which is represented in the right hand part of the drawing, a pair of lifting links 104 are mounted below the apparatus which is to be supported, one end of one link being connected to the platform and one end of the other link being connected to the delivery end of the apparatus. The lifting links 104 are operable via a threaded spindle 103 which operates on their adjacent ends and which is threadedly mounted at 105 in a pivotably mounted nut. If the threaded spindle 103 is rotated via the hand wheel 106 in such a way that the end of the threaded spindle moves to the right, the lifting links are thereby extended in such a way that the delivery end of the apparatus is raised. However, other lifting devices can be used depending upon the weight of the apparatus.

Figure 2:
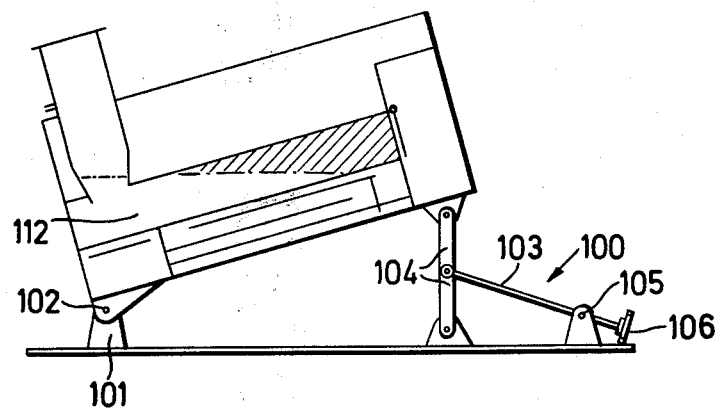
FIG. 2 shows a similar side section to FIG. 1 but in which the reactor tube is moved to a position in which it ascends from the entrance end to the delivery end thereof.

In FIG. 2, the apparatus is illustrated in the position in which the threaded spindle 103 is moved so far to the right that the lifting links 104 are in line and have thus lifted the apparatus to the maximum extent. As is evident from FIG. 2, the reactor tube 112 ascends relatively steeply from the entrance end to the delivery end. A fluid level shown by a dot-dash line in FIG. 2 can thereby be produced. The gaseous substances can collect in the space in the reactor tube which is represented by shading in FIG. 2. By tilting the tube 112 in this way, the reaction time of waste products in the tube 112 can be controlled as no fluid substances can emerge from the delivery end of the reactor device if the incline of the reactor tube 112 is suitably adjusted. The incline of the reactor tube 112 can easily be optimally adjusted during operation in dependence upon the products being treated and in dependence upon the progress of the pyrolisis.

Figure 3:
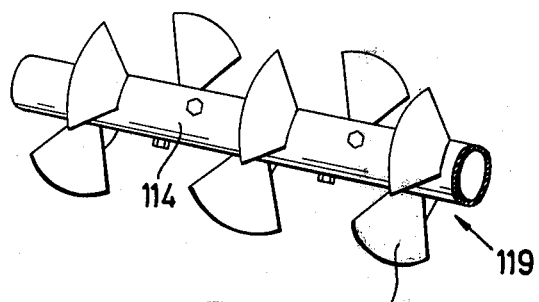
FIG. 3 shows a perspective view of a feed apparatus in which adjustable paddle blades are fixed to a hollow shaft.

FIG. 3 shows a perspective view of a hollow driving shaft 114, on which radially projecting paddle blades 120 are mounted at a predetermined angle of attack. The paddle blades 120, together with the hollow driving shaft 114, form the feed device for the products which are to be treated in the reactor tube 112.

Figure 4:
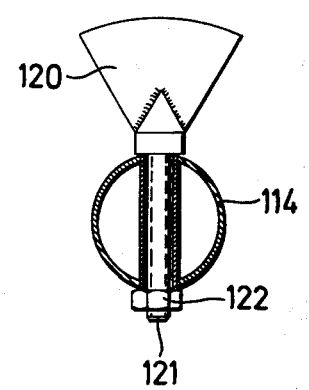
FIG. 4 shows a cross-section through the hollow shaft of FIG. 3, in which the fastening of a paddle blade is illustrated.

FIG. 4 illustrates in detail in a cross-section through the hollow shaft 114, the means by which the paddle blades 120 are fastened to the hollow driving shaft 114. A threaded pin 121 which is fixed radially to the paddle blade 120 serves to fasten the paddle blade 120, which pin passes through corresponding openings in the hollow driving shaft 114 and is fastened on the opposite side by a nut 122. In order to vary the angle of attack of one paddle blade 120, it is sufficient to slacken the nut 122, so that the paddle blade 120 can then be rotated in the desired manner and the nut 122 can finally be tightened again. With the aid of the arrangement represented in FIG. 4, the angle of attack of the individual paddle blades can be adjusted in a simple manner to the desired amount, depending upon the progress of the method or upon the product which is being treated.

With the aid of the arrangement represented in FIG. 4, by varying the angle of attack of the blades, the feed velocity can be optimally adjusted in each of the preheating/gasification/delivery zones.

Figure 5:
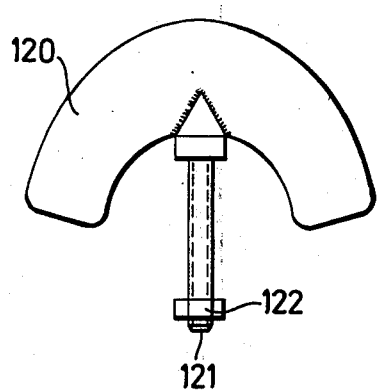
FIG. 5 shows a diagrammatic representation of a paddle blade which extends over a particularly large arc.

A paddle blade 120 which extends over a particularly large arc is represented in FIG. 5. The arc occupied by the paddle blade 120 in FIG. 5 is almost 180°. The fastening of the paddle blade represented in FIG. 5 corresponds to the arrangement which is represented in FIG. 4. Paddle blades extending over particularly large arcs are especially suitable for use in conjunction with a heated hollow shaft 114. If a hot fluid is conducted through the hollow shaft 114, the paddle blades 120 are also heated with the hollow shaft 114, and by this means good heat transference to the product being treated in the reactor tube can be obtained.

Figure 6:
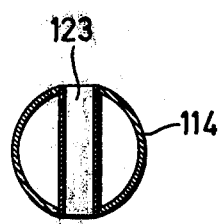
FIG. 6 shows a cross-section through the hollow shaft which is represented in FIG. 3, in which a transverse tube is illustrated in section.

In this case a transverse tube 123 is inserted gastightly into the hollow shaft 114 (FIG. 6). Here, the gastightly inserted transverse tube 123 serves the purpose, on the one hand, of accepting the threaded pin 121 of the paddle blade 120, and on the other hand, of preventing an escape of the hot fluid which is conducted through the hollow shaft 114 via the connection of the paddle blade 120 to the hollow shaft 114.

The shaft of the threaded pin 121 is a sliding fit in the transverse tube 123 in order to promote good heat transference. The transverse tube 123 is advantageously welded to the hollow shaft 114, in order to produce a durable gastight connection.

There has thus been described apparatus for carrying out pyrolysis of waste products of the type mentioned at the outset, which may contain fluid products or deposits and which can treat them for a predetermined time in the reactor and with a consistently high degree of efficiency.

I claim:

1. An apparatus for carrying out the pyrolysis of waste products comprising:
   a reactor vessel having an entrance end and a delivery end;
   heating means disposed around said reactor vessel for heating the waste products in the vessel;
   an air tight charging hopper at the entrance end of the reactor vessel;
   an air tight delivery chamber at the delivery end of said reactor vessel;
   means for driving the waste products through the reactor vessel between said entrance and delivery ends said driving means including a hollow shaft member for conducting hot fluid through said delivery means, said hollow shaft member including a plurality of through apertures, said shaft member further including a plurality of transverse tube members for preventing the escape of the hot fluid said tube members being gas tightly disposed within the through apertures of the shaft member, said driving means further including a plurality of arcuate blade members having elongated stem portions, said stem portions being slidingly fitted within said transverse tube members whereby the heat created by the hot fluid conducted through the hollow shaft is quickly transmitted through the transverse tube members, to the stem portions of the blade members, to the blades and to the waste products being treated;
   a blower, the suction side of which is connected to the delivery end of the vessel; and
   means for adjusting the angle of inclination of the reactor vessel relative to the horizontal whereby the reaction time of the waste products in the vessel can be controlled.

2. Apparatus as claimed in claim 1 in which each paddle blade extends arcuately in a range of between 90° and 180°.

3. An apparatus for carrying out the pyrolysis of waste products as recited in claim 1 in which the blade members are releasably mounted within the transverse tube members such that the angle of each blade may be individually adjusted as desired.

* * * * *